(12) United States Patent
Zaniboni

(10) Patent No.: US 11,498,775 B2
(45) Date of Patent: Nov. 15, 2022

(54) APPARATUS AND METHOD FOR THE TRANSFER OF OBJECTS, IN PARTICULAR COMPONENTS FOR INHALERS

(71) Applicant: I.M.A. Industria Macchine Automatiche S.p.A., Ozzano dell'Emilia (IT)

(72) Inventor: Carlo Zaniboni, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 43 days.

(21) Appl. No.: 17/058,868

(22) PCT Filed: May 21, 2019

(86) PCT No.: PCT/EP2019/063127
§ 371 (c)(1),
(2) Date: Nov. 25, 2020

(87) PCT Pub. No.: WO2019/228869
PCT Pub. Date: Dec. 5, 2019

(65) Prior Publication Data
US 2021/0155416 A1 May 27, 2021

(30) Foreign Application Priority Data

May 28, 2018 (IT) .......................... 102018000005754

(51) Int. Cl.
*A24C 5/01* (2020.01)
*B65G 47/90* (2006.01)
*B65D 85/10* (2006.01)
*B65B 35/36* (2006.01)
*B65G 47/24* (2006.01)

(52) U.S. Cl.
CPC ................ *B65G 47/90* (2013.01); *A24C 5/01* (2020.01); *B65B 35/36* (2013.01); *B65D 85/10* (2013.01); *B65G 47/24* (2013.01)

(58) Field of Classification Search
USPC ....................................................... 198/373
See application file for complete search history.

(56) References Cited

U.S. PATENT DOCUMENTS 9,969,565 B1* 5/2018 Simm ..................... B65B 35/38
2015/0289565 A1* 10/2015 Cadieux .................. A24F 40/80
131/328

FOREIGN PATENT DOCUMENTS

| CN | 103910194 A | 7/2014 |
| JP | 2006256744 A | 9/2006 |
| WO | 2012089302 A1 | 7/2012 |

OTHER PUBLICATIONS

Int'l Search Report and Written Opinion dated Jul. 19, 2019 in Int'l Application PCT/EP2019/063127.

\* cited by examiner

*Primary Examiner* — Ronald P Jarrett
(74) *Attorney, Agent, or Firm* — Panitch Schwarze Belsiario & Nadel LLP

(57) ABSTRACT

An apparatus and a method for the transfer of components for inhalers or vaporizers from a loading station in which the components arrive randomly oriented, toward one or more work stations, to which said components are delivered oriented according to a predetermined orientation.

13 Claims, 6 Drawing Sheets

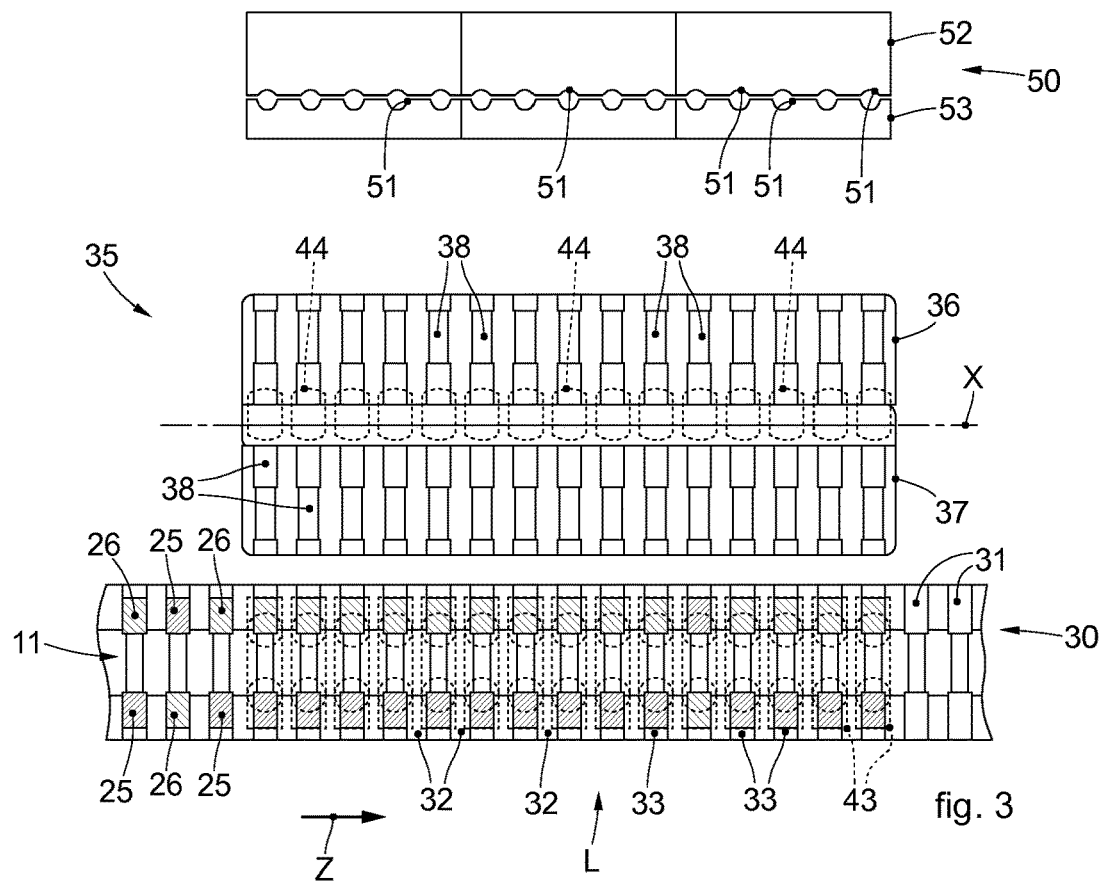
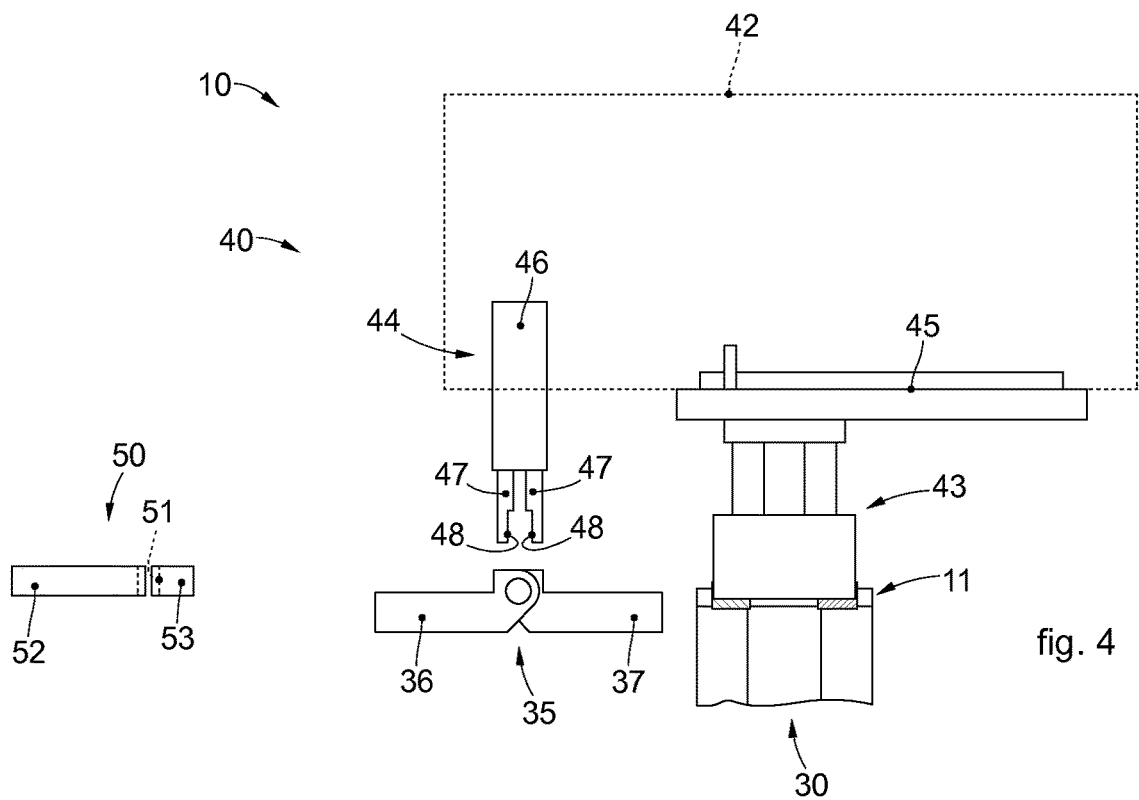

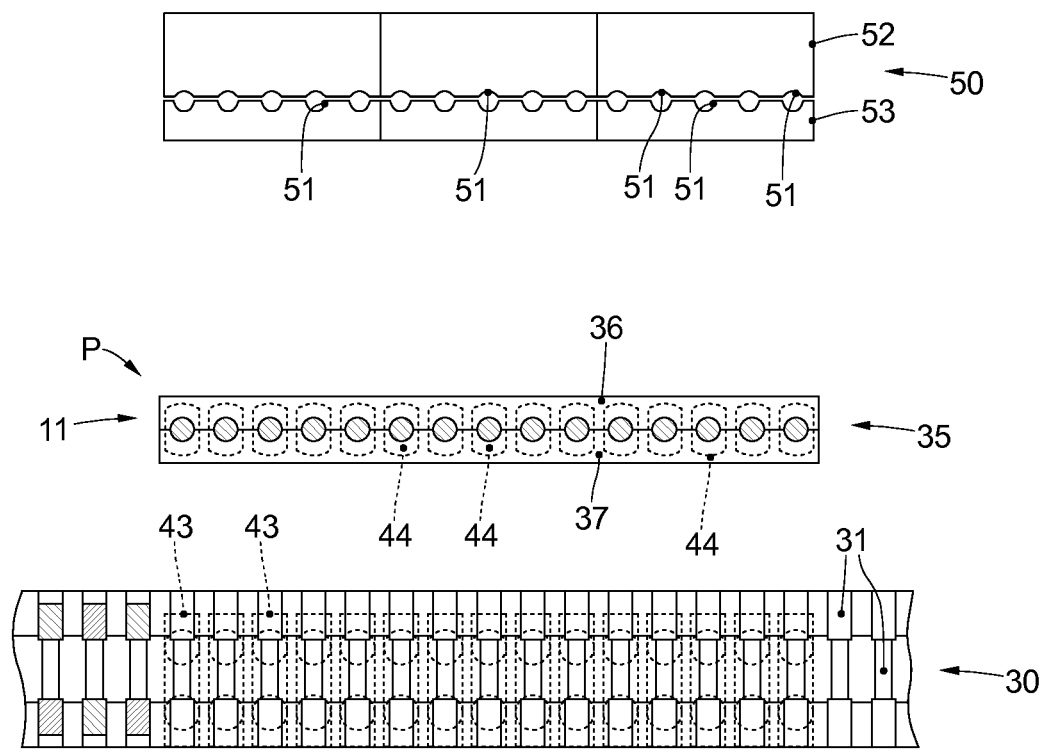
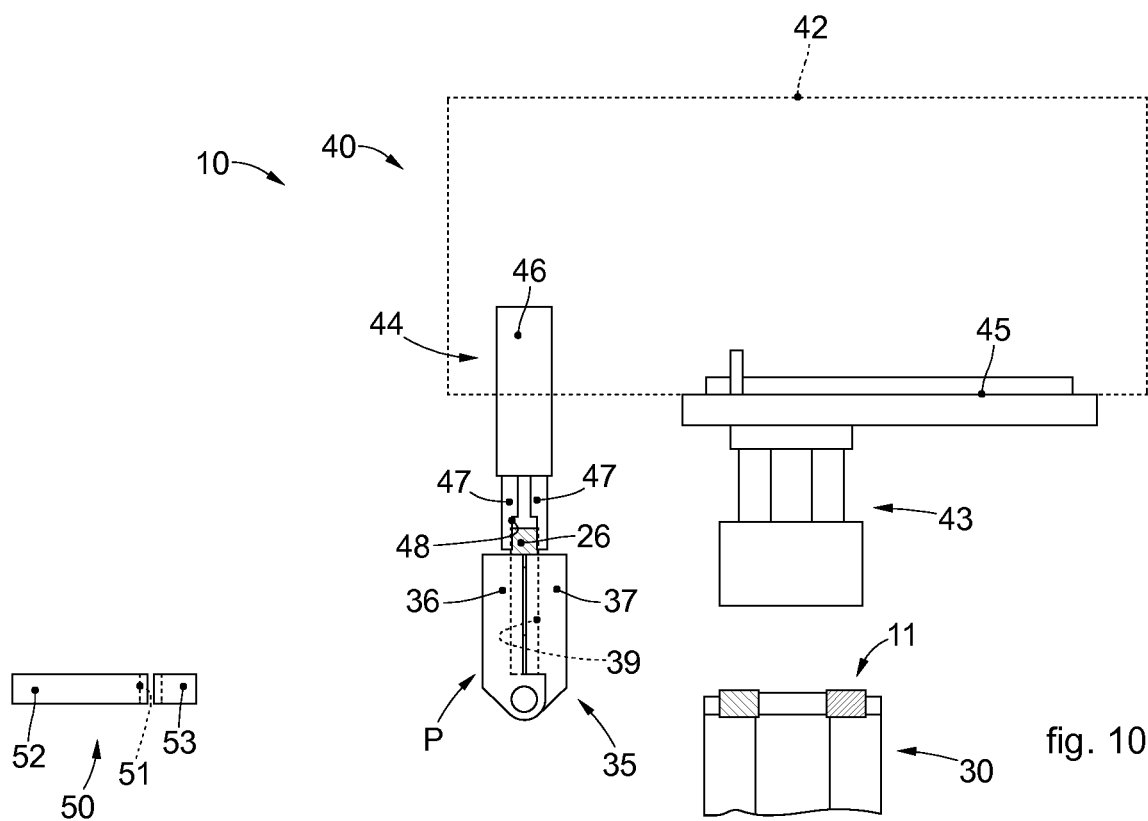
fig. 9
fig. 10

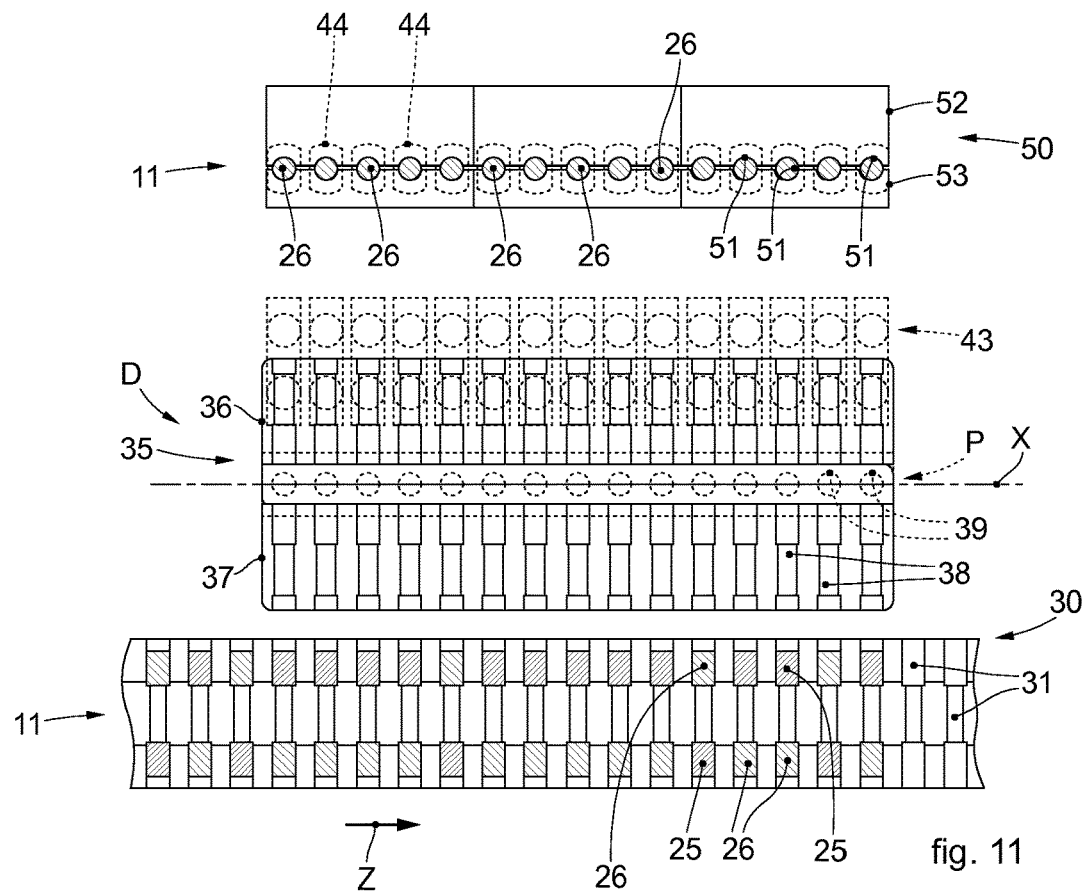
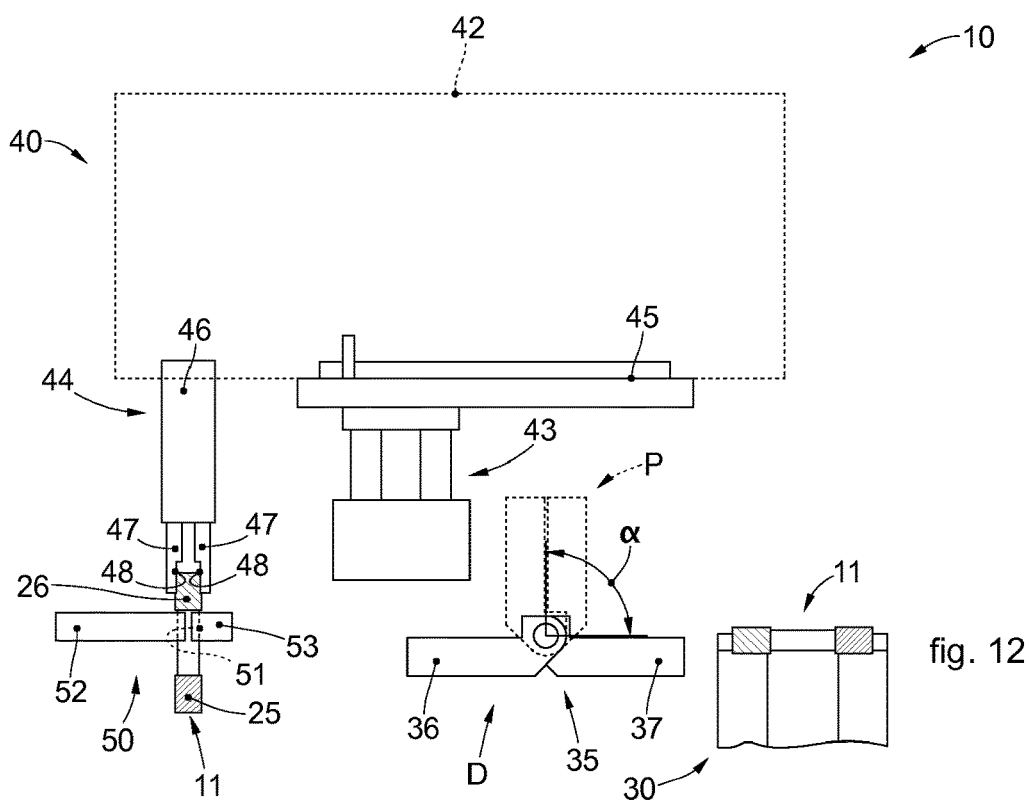
fig. 11
fig. 12

APPARATUS AND METHOD FOR THE TRANSFER OF OBJECTS, IN PARTICULAR COMPONENTS FOR INHALERS

CROSS-REFERENCE TO RELATED APPLICATIONS

This application is a Section 371 of International Application No. PCT/EP2019/063127, filed May 21, 2019, which was published in the English language on Dec. 5, 2019 under International Publication No. WO 2019/228869 A1, and which claims priority under 35 U.S.C. § 119(b) to Italian Patent Application No. 102018000005754, filed on May 28, 2018; and the disclosures of each application cited in this paragraph are incorporated herein by reference.

FIELD OF APPLICATION

The present invention refers to an apparatus and a method for the transfer of components for inhalers or vaporizers in a controlled manner, in order to arrange them in a desired orientation.

In particular, but not only, said components can comprise cartomizers for electronic cigarettes, in other words objects each composed of a cartridge containing an atomizer that is able to transform the liquid it contains into vapour by means of a heating element, for example an electrical resistance.

STATE OF THE ART

In the field of inhalers in general and electronic cigarettes in particular, one component that receives particular attention from the manufacturers of such products is the so-called cartomizer, a cartridge of a substantially tubular form that contains an atomizer that is able to selectively transform into vapour a particular liquid that is also contained by that same cartridge.

In the case of electronic cigarettes the size of a single cartridge is substantially equivalent to the size of a regular tobacco cigarette, for example having a length of approximately 60 mm and an external diameter of approximately 9 mm and an outward surface with a tactile and aesthetic finish that will be appreciated by the user.

Furthermore each cartridge has openings at either end, through which it is possible to arrive at the elements contained by the cartridge, for example a small reservoir for the liquid that is to be vaporized and the electric and electronic parts of the atomizer. In particular, in one end of the cartridge there is a compartment that can accommodate a capsule that contains substances that are to be extracted, either in solid form, such as ground tobacco leaf, possibly also flavoured, or in liquid form, for example nicotine. The other end of the cartridge, on the other hand, is contiguous to said electric components and allows these to be connected to suitable power supply means.

One of the technical problems that designers of machines for the treatment of said components have to face and solve is that of handling the components mechanically and automatically without damaging, not even in the slightest, the external cylindrical surface of each component.

Another problem that designers of machines for the treatment of components for inhalers must take into account is due to the fact that the cartridges are generally fed into the machine in a random and disorderly manner. Consequently many cartridges are oriented in one directions, while other cartridges are oriented in a second direction, opposite to the first one. In other words the cylindrical cartridges are all parallel to each other when they are fed, but certain cartridges are arranged with their extremities inverted with respect to the other cartridges.

The machines for the treatment of components of inhalers mentioned above can be included into to the field of automated assembly lines for inhalers or electronic cigarettes, or for automated inspection lines for the quality control inspections of single components and/or finished products.

It is evident that the machines or automated lines that manipulate objects in a fully automated manner, require that the objects being handled are all arranged in the same orientation so that, in the various work stations, the objects can be handled or treated in the correct way.

A first goal of the present invention is to overcome the drawbacks of the prior art by providing an apparatus and a related method for automatically transferring components of inhalers or vaporizers, in particular but not only cartomizers for electronic cigarettes.

Another goal of the present invention is to provide an apparatus, with related method, that is able to automatically orient the components for inhalers or for electronic cigarettes according to a predetermined spatial orientation.

Another goal of the present invention is to provide an apparatus, and to implement the related method, that allows the components for inhalers or electronic cigarettes to all be oriented in the same direction.

A further goal of the present invention is to provide a fast apparatus that allows a great number of components to be transferred within a particular time frame.

Another goal of the present invention is to provide an apparatus that is very reliable and that makes it possible to avoid or significantly reduce the number of rejected components that are the result of an incorrect orientation.

A further scope of the present invention is to provide an apparatus, and to implement a related method, that is able to manipulate said components of inhalers or electronic cigarettes without damaging the external surface visible to the user, so as not to compromise the external surface finish with scratches or other unwanted marks.

To overcome the drawbacks of the prior art and to obtain these other goals and advantages, the Applicant has studied, experimented and created the apparatus and the method of the present invention.

SUMMARY OF THE INVENTION

The present invention is described and characterized in the independent claims, whereas the dependent claims present other characteristics of the present invention, or variants on the idea of the main solution.

In accordance with said goals, the invention provides an apparatus for the automatic transfer of components of inhalers or vaporizers from a loading station, in which the components arrive randomly oriented, toward one or more work stations to which the components are delivered oriented according to a predetermined orientation.

In one embodiment, the components are delivered to the work station by suitable reception means for the components, which are configured to receive the components in the desired orientation. For example, the reception means could be configured as transfer sliders for components that travel along a conveyance line.

Said components comprise so-called "cartomizers" for electronic cigarettes, i.e. elements that can transform a liquid contained therein into vapour that is to be inhaled, thanks to the operation of a heating element.

It is clear that the apparatus according to the present invention, and the related transfer method, is able to transfer any type of object that is to be handled in an automatic manner, in particular compact objects of small or pocket dimensions.

According to a characteristic aspect of the present invention, the apparatus comprises temporary support means onto which, by gripping means, the components that are to be transferred are released, alternately in at least two release positions depending on the original orientation of the component.

In particular, the temporary support means are configured to move the components from said two different release positions to another position, in which the components are arranged according to said predetermined orientation.

The apparatus comprises sensor means, for example optical sensors, to detect the initial orientation of the components to be transferred.

In one embodiment, the optical sensors are associated with feed means of said components, which feed the components towards a loading station located upstream of the temporary support means.

In one embodiment, the optical sensors are configured to detect if the extremity of the component exposed to their vision is the lower end or the upper end of the component.

According to a characteristic aspect of the present invention, the temporary support means comprise a first support portion and a second support portion, each configured to receive said components in a respective release position.

In particular, the components oriented in a first orientation are released only onto the first support portion in a first release position, whereas the components oriented in a second orientation, different from the first orientation, are released only onto the second support portion, in a second release position.

First orientation and second orientation can refer, for example, to two opposite directions of top-bottom, bottom-top of the components, in which their upper and lower ends are inverted between one orientation and the other.

In one embodiment said gripping means can slide along linear guides to place themselves alternately at the first or the second release position.

In one embodiment, the first support portion and the second support portion are hinged to one another so that they define a hinging axis around which they can rotate at a determined angle of rotation. The angle of rotation can be equal to 90°, for example.

In this embodiment the support portions can rotate between a deposit configuration, in which the support portions are substantially horizontal to receive and support said components, and a pick up configuration, in which the support portions, and the components they accommodate, are substantially vertical. In the removal configuration the support portions are adjacent to each other in order to define a plurality of seats to accommodate a plurality of components.

In some embodiments, each seat is formed by a pair of recesses, each of which is included in a different support portion.

In some embodiments the apparatus comprises handling means configured to move the components from the feed means to the temporary support means.

In some embodiments, the handling means comprise a plurality of gripping means, for example vacuum grippers.

In one embodiment the apparatus comprises vacuum means operatively associated with the temporary support means to facilitate the retention of the components thereon.

In one embodiment, the vacuum means can be connected to the recesses configured to receive and support the components, so that the latter are held on the support means by negative pressure.

In one embodiment, the handling means comprise a plurality of expansion grippers, configured to move the components from the temporary support means to said reception means.

According to the invention a method is also provided for the transfer of components for inhalers or vaporizers from a loading station to one or more work stations by means of said apparatus.

The method according to the invention provides to feed the components to be transferred towards the work station and from there they are moved to the temporary support means by means of handling means.

According to a characteristic aspect of the method according to the invention, is provided to release said components alternately in at least two different release positions onto the temporary support means depending on their initial horizontal orientation.

In particular, the method according to the invention provides to release the components oriented in the first orientation in the first release position only on the first support portion, and to release the components oriented in the second orientation in the second release position only on the second support portion.

In practice the components oriented in a first orientation are released only onto the first support portion 36, whereas the components oriented in a second different orientation are released only onto the second support portion 37.

In some embodiments, before releasing the components onto the temporary support means, it is provided to position the gripping members along said linear guides in a position corresponding to the first or the second release position.

For example, while handling means are moving over the temporary support means, the gripping members which retain the components oriented in the first orientation can remain stationary at one end of the respective linear guide, while other gripping members which retain the components oriented in the second orientation can slide along the respective linear guides to reach the opposite end of the guide.

In one embodiment, after the step of releasing the components, the method provides the rotation of the first and the second support portion around a hinging axis for a determined angle of rotation, for example approximately 90°.

In one embodiment, the method comprises, after the release step, and at least during the rotation step, activating the vacuum means associated with the temporary support means to hold the components onto the support portions.

These and other aspects, characteristics, and advantages of the present disclosure will be better understood with reference to the following description, figures and enclosed claims. The figures, which are an integral part of the present description, illustrate some embodiments of the present invention and, together with the description, are intended to describe the main principles of this disclosure.

The various aspects and characteristics described in the present description can be applied individually, where possible. These individual aspects, for example aspects and characteristics present in the description or in the enclosed dependent claims, may become the subject of divisional applications.

It should be noted that any aspect or characteristic found to be already known during the patent application procedure, will be exempted from being claimed and instead be the subject of a disclaimer.

DESCRIPTION OF THE DRAWINGS

These and other characteristics of the present invention will become clear in the following description of a preferred embodiment, provided solely as non-limiting example, with reference to the enclosed drawings, wherein:

FIGS. 3-12 are schematic view, from above and from the side, of a sequence of consecutive operational steps of the method according to the present invention as implemented in the apparatus of FIG. 1.

For ease of understanding identical reference numbers have been used where possible to identify common elements in the figures. This means that elements and characteristics of one embodiment can conveniently be incorporated in other embodiments without additional clarifications.

DESCRIPTION OF EMBODIMENTS

In the following reference is made in detail to the various embodiments of the invention, of which one or more examples are illustrated in the enclosed figures. Each example is provided as an illustration of the invention and should not be interpreted as a limitation thereof. For example, the illustrated or described characteristics of one embodiment can be adapted to or associated with other embodiments to create a further embodiment. This means that the present invention comprises all those modifications and variations.

Before describing the embodiments, it is further clarified that the present description is not limited in its application to the construction details and arrangement of the components as described in the following description, using the enclosed figures. The present description can include other embodiments and can be realised or put into practice in various ways. Furthermore it is clarified that the phrasing and terminology used here are for descriptive purposes, and should not be taken as limitative.

It is pointed out that in the present description and in the claims the terms top, upper, lower, back, front, external and internal and variations thereon only serve to better illustrate the present invention with reference to the figures, and should not be used in any way to limit the scope of the invention itself or the scope of protection as defined by the claims.

Figure 1:
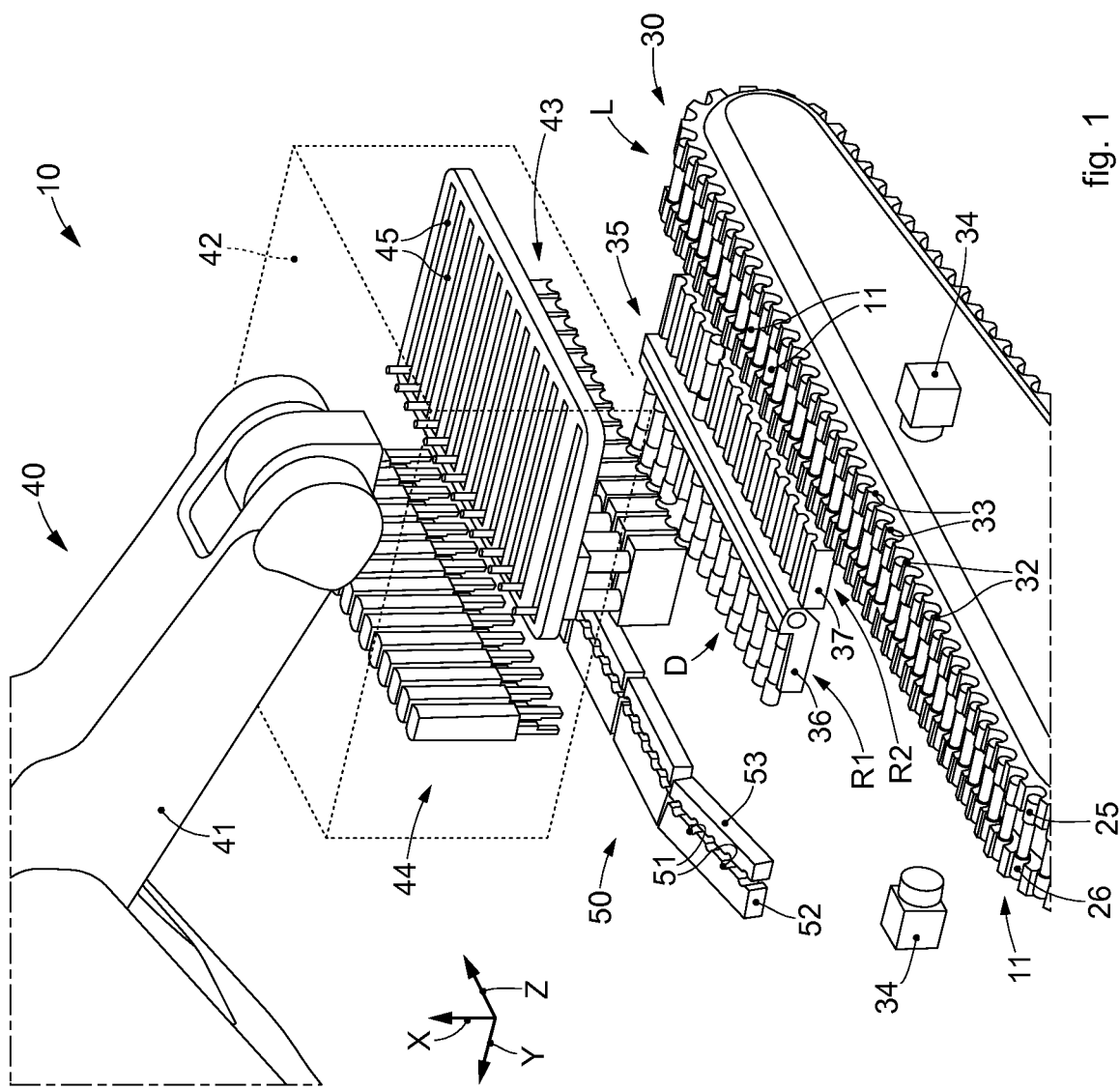
FIG. 1 is an axonometric view, partial and schematic, of an apparatus in accordance with the present invention.

With reference to FIG. 1, an apparatus 10 for the automatic transfer of components for inhalers or vaporizers, for example cartomizers 11 for electronic cigarettes, is described.

The apparatus 10 can advantageously be integrated in an automatic assembly and/or inspection line for said components for inhalers or vaporizers.

Figure 2:
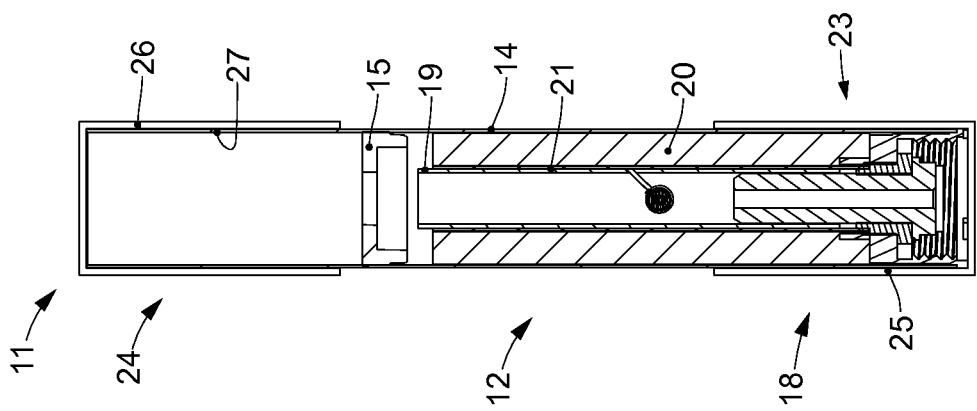
FIG. 2 is a schematic cross-section view of a cartomizer that can be handled by the apparatus of FIG. 1.

To better understand the inventive concept of the present invention, before describing in detail the apparatus 10 and the related method, with reference to FIG. 2, first an example of the construction of a cartomizer 11 will be described, it being understood that the present invention is not limited to this example, but that it can be used for the automatic treatment of any component of inhalers that is already known or that will be developed in the future.

By way of example a cartomizer 11 comprises a central tubular body 12 having an internal cavity 12 that is open at both ends and an external surface 14, treated in a known manner to be pleasant both to the touch and to the aesthetic appearance. In the example given here, the cartomizer 11 has a length of approximately 60 mm and an external diameter of approximately 9 mm, and the thickness of the cylindrical wall of the central body 12 is approximately 0.2 mm.

The cartomizer 11 comprises a lower end 23 and an upper end 24.

In the lower end 23, inside the cavity 13, a heating unit 18 is located, around which a tubular element 19 made of glass fibre is arranged. Coaxial with the latter and against the internal wall of the cavity 13 a bushing 20 is arranged. In the annular space between the tubular element 19 and the bushing 20 a cotton felted cloth 21 is arranged, which is configured to be imbued with a specific liquid that is intended to be vaporized during the selective activation of the heating unit 18. A blocking ring 22 is adapted to be arranged over the felted cloth 21 after the latter has been imbued with liquid.

In the upper end 24, inside the cavity 13, a compartment 27 is defined that extends for a depth of approximately 8-9 mm and that is configured to potentially accommodate a tobacco capsule, or some other substance that is suitable to provide a specific flavour to the vapour that the user inhales by drawing in air through the upper end 24 of the cartomizer 11.

Each cartomizer 11, during its transport and packaging, so until it is used by the end user, is conveniently protected in such a manner that at least its lower end 23, i.e. the part near the heating unit 18, and the upper end 24, i.e. the part near the internal compartment 27, are protected from any undesirable contact, impact or damage.

To provide this protection, in accordance with one embodiment, each cartomizer 11 comprises protective caps 25, 26 that cover, at least partially, the external surface of the cartomizer 11.

In some embodiments the cartomizer 11 comprises a lower cap 25 that covers the lower end 23 and an upper cap 26 that covers the upper end 24.

In one embodiment the caps 25 and 26 are made of a soft and transparent material, for example silicone.

The apparatus 10 comprises a conveyor belt 30 configured to feed a plurality of cartomizers 11 towards a loading station L.

The conveyor belt 30 comprises a belt or a chain having a plurality of recesses 31, each intended to receive a respective cartomizer 11.

The conveyor belt 30 defines a plane of advancement of the cartomizers 11, arranged substantially horizontally.

Each recess 31 can have a hemicylindrical shape in order to define a kind of support cradle for the respective cartomizer 11.

The conveyor belt 30 comprises, in proximity of its edges, a plurality of ridges 32 configured to define a series of depressions 33. The ridges 32 and depressions 33 follow one another along a direction of advancement Z of the cartomizers 11.

Each depression 33 is configured to receive one of the lower or upper ends 23, 24 of the cartomizer 11.

The apparatus 10 comprises at least one optical sensor 34 turned toward the conveyor belt 30.

In one embodiment the apparatus 10 comprises two optical sensors 34, located on opposite sides of the conveyor belt 30 in such a manner that thanks to the optical sensors 34 it is possible to observe both edges of the belt.

In one embodiment the optical sensors 34 are configured as high speed or ultra high speed cameras of the known kind, able to acquire a high number of images in a specific time frame.

It should be noted that the optical sensors 34 are located close to the plane of advancement of the cartomizers 11 so that at least a lateral portion of the conveyor belt 30 is included in their field of view.

Each optical sensor 34 is configured to acquire images of the end of the cartomizer 11 that is turned toward the sensor, in order to detect whether it is the lower end 23 or the upper end 24.

The apparatus 10 comprises a support plate 35 that defines temporary support means for the cartomizers 11.

The plate 35 comprises a first support portion 36 and a second support portion 37.

The first support portion 36 and the second support portion 37 are different from each other.

The first support portion 36 and the second support portion 37 are hinged to each other in order to be able to rotate with respect to each other.

In this configuration a hinging axis X is defined that extends substantially parallel to said direction of advancement Z.

Each support portion 36, 37 comprises a plurality of recesses 38, each of which is configured to receive a respective cartomizer 11.

In one embodiment, each support portion 36, 37 can comprise, by way of non-limiting example, fifteen recesses 38.

The first support portion 36 and the second support portion 37 are movable between a deposit configuration D, in which they receive the cartomizers 11 that arrive from the conveyor belt 30, and a removal configuration P, in which they cooperate to define a support member for the cartomizers 11, which are ready to be transferred towards subsequent work stations.

In one embodiment, in the removal configuration P the first and second support portion 36, 37 are substantially coplanar with the plane of advancement of the cartomizers 11.

In this embodiment, the support portions 36, 37 and the plane of advancement lie on the same substantially horizontal plane.

Between the deposit configuration D and the removal configuration P, each support portion 36, 37 rotates around the hinging axis X by an angle of rotation a equal to approximately 90°.

In this embodiment, in the removal configuration P the support portions 36, 37 are arranged substantially vertical and adjacent to each other.

The movement of the support portions 36, 37 can be obtained by suitable activation means of the kind known in the art.

In the removal configuration P, the support portions 36, 37 are located adjacent to each other so that the recesses 38 of the first support portion 36 face the corresponding recesses 38 of the second support portion 37.

In the removal configuration P, each pair of opposite recesses 38 (one of which is on the first support portion 36 and one is on the second support portion 37) forms a seat 39 configured to receive a related cartomizer 11.

In one embodiment, the hollows 38 have a semicylindrical form and the seats 39 have a cylindrical form.

In one embodiment, the recesses 38 are in contact with vacuum means (not illustrated) able to temporarily hold the cartomizers 11 by negative pressure, for example during the repositioning of the support portions 36, 37 from the deposit configuration D to the removal configuration P.

The apparatus 10 comprises handling means 40.

The handling means 40 comprise an articulated arm 41, commonly employed in the field of automated machines or lines for the automatic movement of objects.

The handling means 40 comprise a frame 42 that is hinged to the articulated arm 41.

The handling means 40 furthermore comprise a plurality of first gripping means 43, and a plurality of second gripping means 44, each of these gripping means 43, 44 being configured to remove and temporarily hold a respective cartomizer 11.

The first gripping means 43 comprise a plurality of vacuum grippers, of the type known in the art, located side by side and above the support portions 36, 37.

In one embodiment, the first gripping means 43 comprise fifteen vacuum grippers.

The apparatus 10 comprises a vacuum system (not illustrated) connected to said vacuum grippers.

The frame 42 comprises a plurality of linear guides 45, which are associated with the first gripping means 43.

The first gripping means 43 are connected to the linear guides 45 through one or more mechanisms known in the art, for example a pinion-rack connection.

In one embodiment, each vacuum gripper is installed on the frame 42 at a respective linear guide 45.

The linear guides 45 extend along a transverse direction Y that extends in a substantially orthogonal direction with regard to the direction of advancement Z.

Each vacuum gripper including the first gripping means 43 is movable between a first release position R1 and a second release position R2. In the first release position R1 the vacuum gripper is located at an end of the linear guide 45, whereas in the second release position R2 the vacuum gripper is located at the other end of the linear guide 45.

In this manner, in the first release position R1 the vacuum grippers are located above the first support portion 36, whereas in the second release position R2 the vacuum grippers are located above the second support portion 37.

In one embodiment, the first gripping means 43 comprise support elements 46 that connect the vacuum grippers to the frame 42.

In one embodiment, the support elements 46 integrate automatic activation mechanisms, such as a piston-cylinder group, which allow the grippers to move vertically along a vertical axis K.

The vertical axis K is substantially orthogonal to the transverse direction Y and the direction of advancement Z, together forming a three-axis Cartesian system.

The second gripping means 44 comprise a plurality of expansion grippers, for example fifteen expansion grippers.

In other embodiments it is clear that the first and second gripping means 43, 44 can comprise any number of grippers. Advantageously, though, it is preferable that the number of grippers between the first and the second gripping means 43, 44 is equal to the number of recesses 38 located on the first and second support portion 36, 37.

In one embodiment, said expansion grippers comprise two gripping elements 47 which are movable in closing and opening with respect to one another.

The movement of the gripping elements 47 can be operated by systems known in the art, for example of a pneumatic kind.

Each gripping element 47 comprises a recess 48 at which the gripping element 47 is configured to engage with one of the ends 23, 24 of the cartomizer 11.

When the gripping elements 47 move closer together, they engage with an end 23, 24 of the cartomizer 11 to retain the latter. When the gripping elements 47 move apart, the cartomizer 11 is released.

The apparatus 10 comprises one or more transfer sliders 50 that function as reception means for the cartomizers 11.

The transfer sliders 50 comprise a plurality of additional seats 51, each intended to receive a respective cartomizer 11.

In one embodiment, each transfer slider 50 comprises five additional seats 51.

Advantageously it is preferable that the number of additional seats 51 comprised in each transfer slider 50 is a submultiple of the number of first and second gripping means 43, 44 and/or the number of recesses 38 located in the support portions 36, 37.

The additional seats 51 are defined at least in part by a fixed portion 52 and at least in part by a mobile portion 53.

After the second gripping means 44 have positioned the cartomizers 11 in the additional seats 51, the mobile portion 53 moves in the direction of the fixed portion 52 so as to hold the cartomizers 11 inside the additional seats 51.

In one embodiment, the cartomizers 11 are held inside the additional seats 51 thanks to the relative engagement between the portions 52, 53 and one of the protective caps 25, 26, in particular the upper protective cap 26 arranged upwards.

In one embodiment, the transfer sliders 50 are attached to a transport device (not illustrated), for example a chain or a closed-loop belt. The transport device allows the transfer sliders 50 to be taken to one or more consecutive work stations.

With reference to FIGS. 3-12 the following description presents the steps of the method in accordance with the invention as executed by the apparatus 10 described previously.

In these figures, the lower cap 25 and the upper cap 26 are depicted with slanted hatching in opposite directions in order to distinguish between them.

For example, the right-slanted hatching illustrates the lower cap 25, whereas the left-slanted hatching illustrates the upper cap 26.

It should also be noted, that in the plan views of FIGS. 3, 5, 7, 9, 11 the first and second gripping means 43, 44 are depicted as dashed lines to make the drawing clearer.

Initially the cartomizers 11 are fed onto the conveyor belt 30 and the handling means 40 bring the fifteen vacuum grippers included in the first gripping means 43 in contact with the same number of cartomizers 11 to hold them by negative pressure (FIGS. 3 and 4).

At this moment no cartomizers 11 are present on the first and second support portion 36, 37.

In FIG. 3 the two cavities 31 on the far right of the figure are empty, i.e. they do not contain a cartomizer 11. The reason for this is that the cartomizers 11 that were located in these two cavities 31 have already been transferred towards the support portions 36, 37 in the transfer cycle that preceded this one, with a different group of fifteen cartomizers 11.

Figure 5:
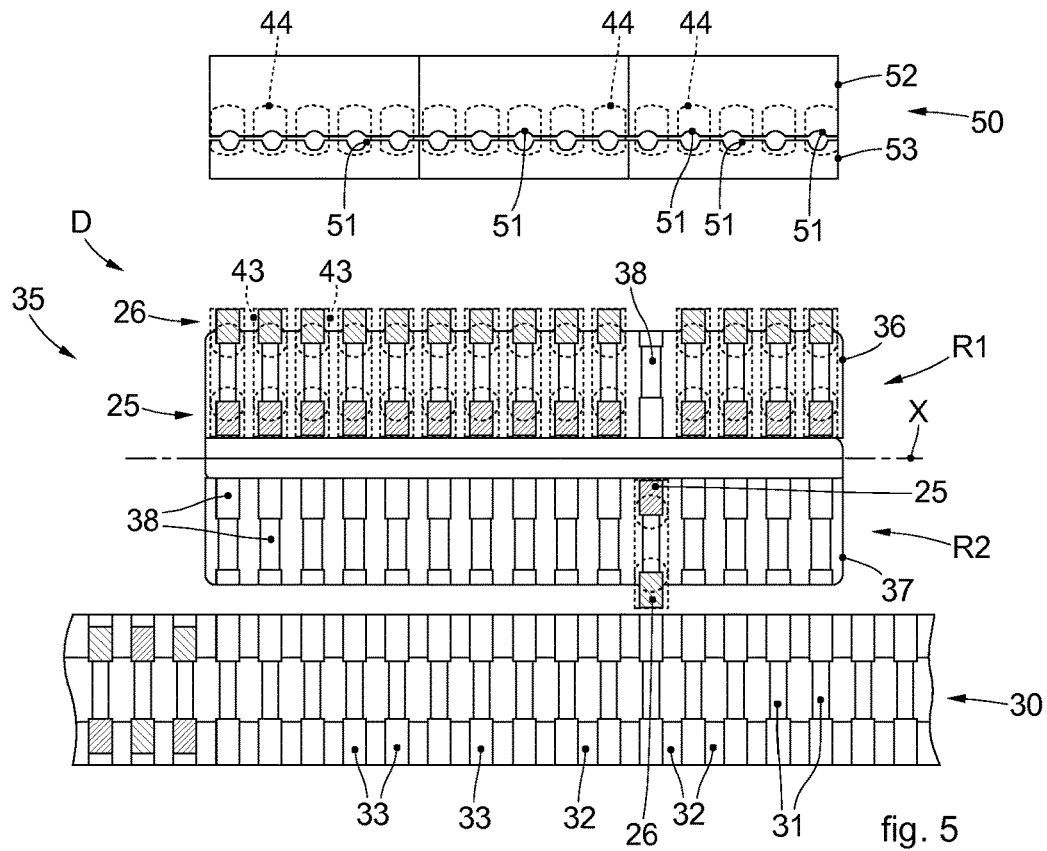
Figure 6:
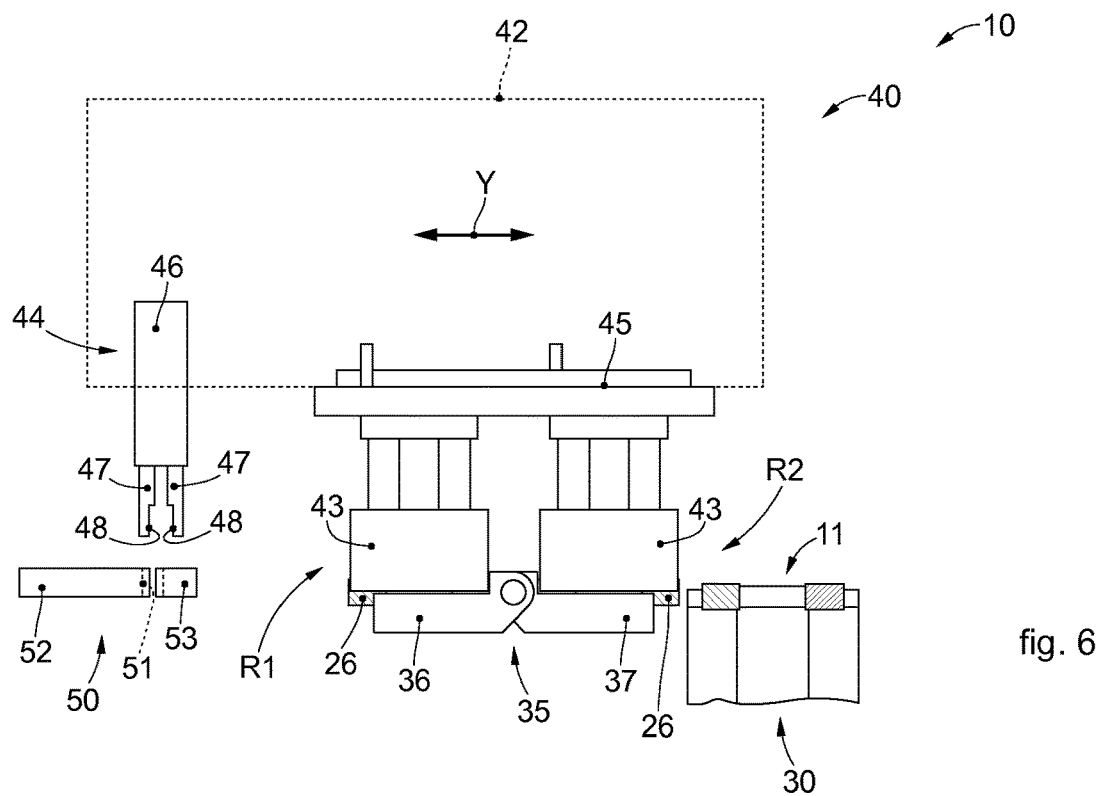

Subsequently the handling means 40 move so that the vacuum grippers comprised in the first gripping means 43 are brought above the first and second support portion 36, 37 at the respective recesses 38, into the interior of which they release the cartomizers 11 they are holding (FIGS. 5 and 6).

In this step the first gripping means 43 move alternately to the first or to the second release position R1, R2 depending on how the ends 23, 24 of the cartomizer 11 are arranged.

As can be seen in FIG. 5, the eleventh cartomizer 11 of the group of fifteen is oriented in an opposite direction, i.e. rotated by 180° with respect to the others. As the orientation of the cartomizers 11 is known, thanks to the sensor means 34, the control and command unit that operates the apparatus 10 orders the first gripping means 43 to move along the linear guides 45 depending on the orientation of the cartomizers 11.

In the example of FIG. 5, only the vacuum gripper that holds the eleventh cartomizer 11 is moved to reach the second release position R2, while all the remaining vacuum grippers remain stationary to stay in the first release position R1.

In this manner, it will be noted that advantageously all fifteen cartomizers 11 are arranged in such a manner that their lower ends 23, and the lower caps 25 that cover them, are all turned towards the hinging axis X, independent of the initial orientation of the cartomizers 11.

Figure 7:
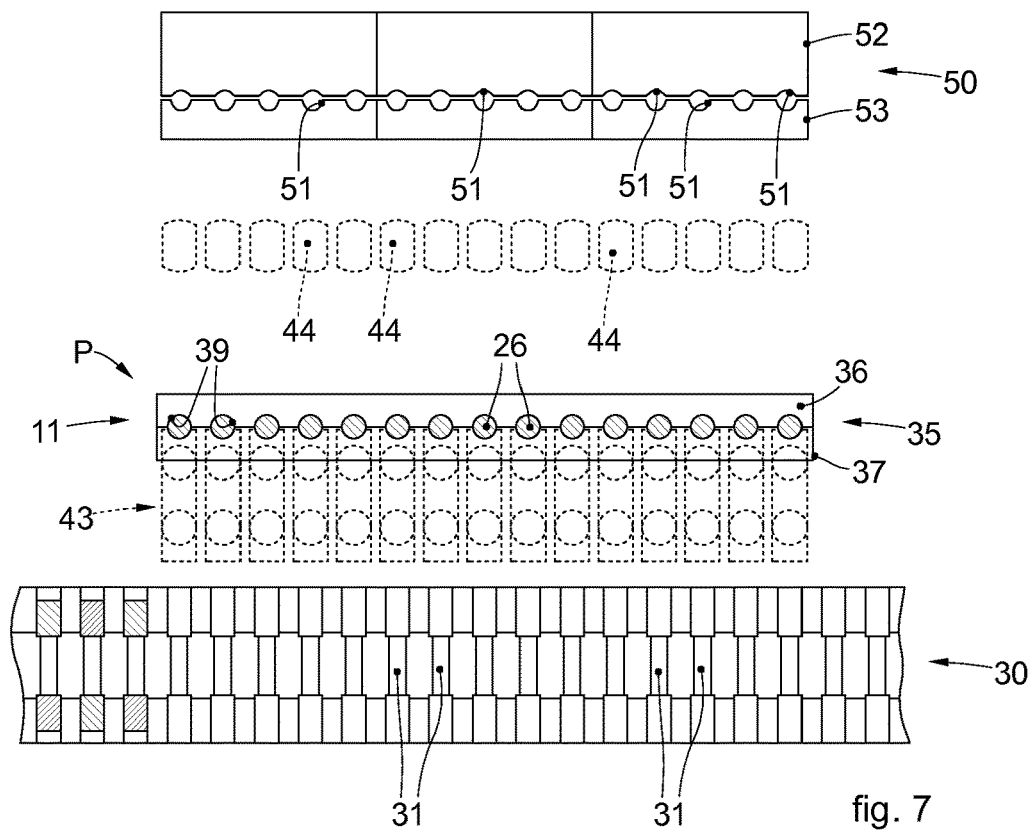
Figure 8:
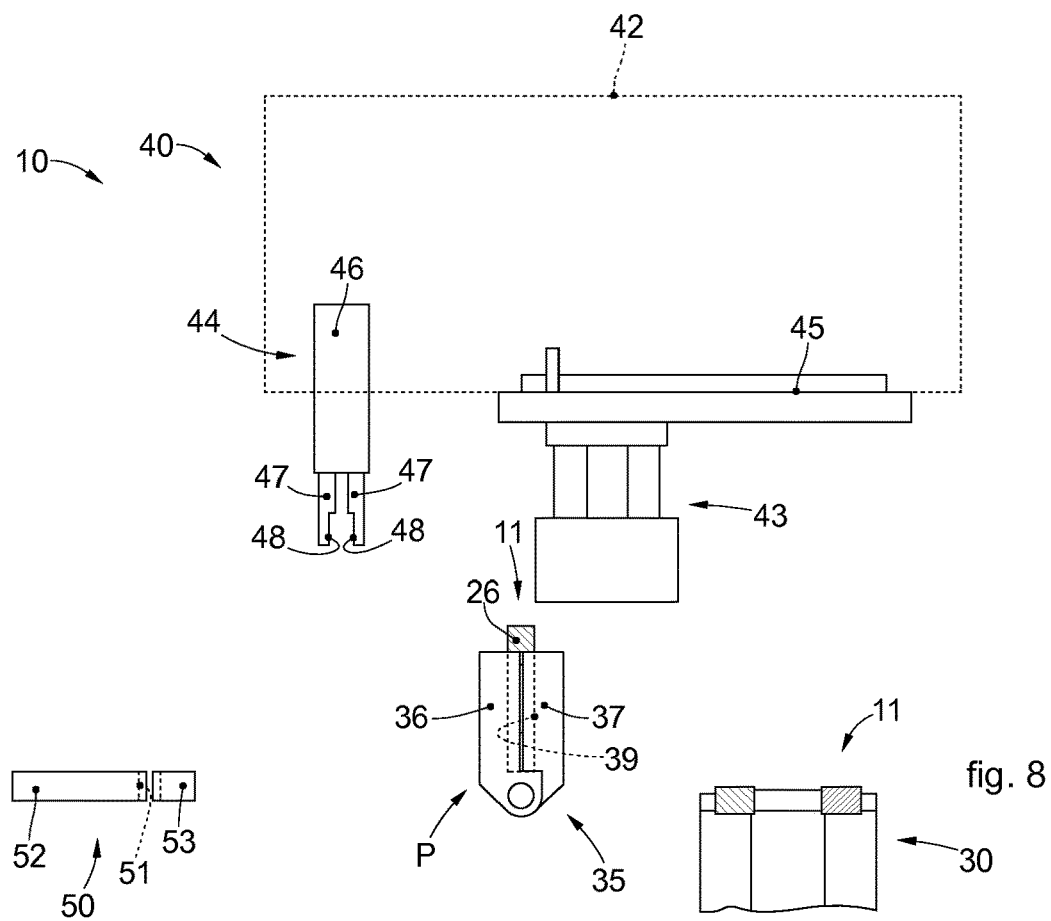

In a subsequent step the handling means 40 lift up so that the first and second support portion 36, 37 can move from the deposit configuration D to the removal configuration P, i.e. from a position that is substantially horizontal, to a position that is substantially vertical (FIGS. 7 and 8).

Consequently the cartomizers 11 are inside the seats 39, arranged in a vertical position and all oriented in the same direction. In particular, the rotation of the support portions 36, 37 causes the cartomizers 11 to be arranged with the upper ends 24, and the upper caps 26, facing upwards.

Still subsequently, the expansion grippers comprised in the second gripping means 44 engage the cartomizers 11 by gripping them, in particular, at the upper cap 26 (FIGS. 9 and 10).

Finally the second gripping means 44 deliver the cartomizers 11 to the transfer sliders 50, placing them inside the additional seats 51 (FIGS. 11 and 12).

In this step the first and second support portions 36, 37 arrange themselves in the deposit configuration D, i.e. substantially horizontal, and the conveyor belt 30 is moved so that a plurality of further cartomizers 11 to be transferred, are moved in the direction of advancement Z in order to be arranged in proximity of the support portions 36, 37.

The apparatus 10 is then ready for a new transfer cycle, in which the steps of the method described above with reference to the FIGS. 3-12 are repeated.

It will be clear that modifications and/or addition of parts and/or steps can be made to the apparatus and to the related method described here, without however going beyond the scope of protection of the present invention.

It will also be clear that even though the present invention is described with reference to a specific example of embodiment, a person skilled in the art will certainly be able to realize many other equivalent forms of the apparatus or method having the characteristics as defined in the enclosed claims and therefore falling within the scope of protection as defined by these claims.

In the following claims the purpose of the references in parentheses is to facilitate reading and they should not be considered limiting factors where the scope of protection as defined by the specific claims is concerned.

I claim:

1. An apparatus to automatically transfer components (11) for inhalers or vaporizers from a loading station (L), in which the components (11) arrive randomly oriented, toward one or more work stations to which said components (11) are delivered oriented according to a predetermined orientation, comprising:

feed means (30) to feed said components (11) towards said loading station (L), sensors (34) arranged to detect an initial orientation of said components (11), temporary support means (35) configured to receive said components (11) from said feed means (30), handling means (40) configured to move said components (11) from said feed means (30) to said temporary support means (35) and to release said components (11) onto said temporary support means (35) alternately in two different release positions (R1, R2) depending on their initial orientation detected by said sensors (34);

reception means (50) of said components (11), configured to receive said components (11) from said handling means (40) and to accommodate said components (11) oriented according to said predetermined orientation so as to convey them towards said one or more work stations, wherein said temporary support means (35) comprise a first support portion (36) configured to receive only said components (11) oriented according to a first orientation and a second support portion (37), different from said first support portion (36), configured to receive only said components (11) oriented in a second orientation, different from said first orientation, said first support portion (36) and said second support portion (37) being hingedly connected to one another about a hinging axis (X) and rotatable with respect to each other about the hinging axis (X) to move said components (11) from said two different release positions (R1, R2) to another position in which said components (11) are arranged according to said predetermined orientation.

2. An apparatus as in claim 1, wherein said first support portion (36) and said second support portion (37) define a deposit configuration (D) in which said components (11) are rested on said support portions (36, 37), and a pick up configuration (P) in which said support portions (36, 37) cooperate with each other to define seats (39) able to support said components (11), where each of said seats (39) is partly delimited by said first support portion (36) and partly by said second support portion (37).

3. An apparatus as in claim 2, wherein said first support portion (36) and said second support portion (37) comprise a plurality of hollows (38), each suitable to receive a respective component (11), wherein each hollow (38) of said first support portion (36) is configured to form, together with a respective hollow (38) of said second support portion (37), one of said seats (39).

4. An apparatus as in claim 2, wherein, in said deposit configuration (D), said first support portion (36) and said second support portion (37) lie on a substantially horizontal plane and are substantially coplanar with a feed plane of said components (11) on said feed means (30).

5. An apparatus as in claim 2, wherein between said deposit configuration (D) and said removal configuration (P), each of said support portions (36, 37) rotates about the hinging axis (X) by a determinate angle of rotation (α) equal to about 90°.

6. An apparatus as in claim 2, wherein said handling means (40) comprise a support frame (42) to which a plurality of gripping means (43, 44) are fixed, each suitable to selectively engage with one of said components, and wherein said gripping means comprise a plurality of expansion grippers (44) attached to said frame (42) and configured to pick up a plurality of said components (11) from a respective one of said seats (39) defined by said temporary support means (35) for carrying each component (11) to a corresponding additional seat (51) formed on said reception means (50).

7. An apparatus as in claim 1, wherein said handling means (40) comprise a support frame (42) to which a plurality of gripping means (43, 44) are fixed, each suitable to selectively engage with one of said components (11).

8. An apparatus as in claim 7, wherein said gripping means comprise a plurality of vacuum grippers (43) configured to pick up a plurality of said components (11) from said feed means (30) and to hold them by negative pressure, and wherein said vacuum grippers (43) are movable with respect to said support frame (42) along respective linear guides (45) so that said vacuum grippers (43) can reach a first release position (R1), in which said vacuum grippers (43) are arranged on said first support portion (36) in order to release said components (11) onto it, and a second release position (R2), in which said vacuum grippers (43) are arranged on said second support portion (37) in order to release said components (11) onto it.

9. An apparatus as in claim 1, wherein said reception means (50) comprise a plurality of additional seats (51), each configured to receive a corresponding component (11); wherein said additional seats (51) comprise a fixed portion (52) and a mobile portion (53) which can move toward or away from the fixed portion (52), respectively to support said components (11) in, or to disengage said components (11) from, said additional seats (51).

10. A method to automatically transfer components (11) for inhalers or vaporizers from a loading station (L), in which the components (11) arrive randomly oriented, toward one or more work stations to which said components (11) are delivered oriented according to a predetermined orientation, comprising the steps of:

feeding said components (11) on feed means (30) towards said loading station (L), detecting, through sensors (34), an initial orientation of said components (11) while they are advancing towards said loading station (L), moving said components (11) from said feed means (30) to temporary support means (35) by means of handling means (40), wherein said handling means (40) comprises a support frame (42) to which a plurality of gripping means (43, 44) are fixed, each suitable to selectively engage with one of said components (11), and wherein the temporary support means (35) comprises a first support portion (36) and a second support portion (37) hingedly connected to one another about a hinging axis (X), releasing said components (11) onto said temporary support means (35) alternately in at least two different release positions (R1, R2) depending on their initial orientation, wherein components (11) oriented in a first orientation are released onto the first support portion (36) in a first release position (R1) of the at least two different release positions (R1, R2) and components (11) oriented in a second orientation, different from said first orientation, are released onto the second support portion (37) in a second release position (R2) of the at least two different release positions (R1, R2), rotating said first support portion (36) and said second support portion (37) about the hinging axis (X), thereby moving said components (11) from said two different release positions (R1, R2) to another position in which said components (11) are arranged according to said predetermined orientation, moving said components (11) from said temporary support means (35) to reception means (50) by means of said handling means (40), and depositing said components (11) in said reception means (50), said components (11), once deposited, being oriented according to said predetermined orientation.

11. The method as in claim 10, wherein it provides to slide said gripping means (43) comprised in said handling means (40) along respective linear guides (45) to take said gripping means (43) alternately to one or the other end of said linear guides (45), so that, when said gripping means (43) are arranged at said ends, they are positioned respectively in correspondence with said first or second release position (R1, R2).

12. The method as in claim 10, wherein, after said release step, it comprises a step of rotating said support portions (36, 37) about the hinging axis (X) by an angle of rotation ($\alpha$).

13. The method as in claim 12, wherein, after said release step, and at least during said rotation step, provides for activating suction means associated with said temporary support means (35) to hold said components (11).

\* \* \* \* \*